United States Patent
Bauch et al.

(10) Patent No.: US 6,826,371 B1
(45) Date of Patent: Nov. 30, 2004

(54) VARIABLE RATE DPSK SYSTEM ARCHITECTURE

(75) Inventors: Jeffery S. Bauch, Redondo Beach, CA (US); Todd E. Humes, Newbury Park, CA (US); James A. Roth, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 494 days.

(21) Appl. No.: 09/595,285

(22) Filed: Jun. 15, 2000

(51) Int. Cl.⁷ .................. H04B 10/04; H04B 10/06
(52) U.S. Cl. .................. 398/188; 398/183; 398/202; 398/214; 398/198
(58) Field of Search .................. 359/183, 181, 359/188, 154, 173; 398/188, 183, 202, 214, 181, 198

(56) References Cited

U.S. PATENT DOCUMENTS

| | | | |
|---|---|---|---|
| 3,633,034 A | * | 1/1972 | Uchida et al. ........... 398/74 |
| 3,811,774 A | * | 5/1974 | Honeycutt et al. ........ 356/5 |
| 4,703,471 A | * | 10/1987 | Fitelson et al. ......... 398/43 |
| 5,864,625 A | * | 1/1999 | Rutledge ............... 380/31 |
| 6,072,812 A | | 6/2000 | Eng .................... 372/20 |
| 6,271,950 B1 | * | 8/2001 | Hansen et al. .......... 359/135 |
| 6,271,953 B1 | * | 8/2001 | Dishman et al. ........ 359/172 |
| RE37,801 E | * | 7/2002 | Shimada et al. ........ 369/275.3 |
| 6,473,438 B1 | * | 10/2002 | Cioffi et al. .......... 370/468 |

* cited by examiner

*Primary Examiner*—M. R. Sedighian
(74) *Attorney, Agent, or Firm*—Katten Muchin Zavis Rosenman; John S. Paniaguas

(57) ABSTRACT

A communication system and more particularly to a variable rate differential phase shift keying (DPSK) communication system with minimal hardware that does not have power or performance penalties associated with known DPSK modulation systems is disclosed. The DPSK modulation system in accordance with the present invention includes a transmitter, which includes a carrier signal source, a phase modulator and a DPSK encoder for modulating a carrier signal. The modulated carrier signals may be amplified, for example, in optical communication systems by a rare earth element doped fiber amplifier. The signals are continuously transmitted to a multi-rate receiver through a communication channel, for example, free space. The multi-rate receiver includes a single demodulator, for example, a single optical interferometer, used for multiple integer sub-harmonic data rates which demodulates the modulated signal. The demodulated signals are detected, for example, in optical communication systems by an arrangement of photodiodes, and the detected signals are applied to, for example, a clock and data recovery circuit that is tuned as a function of data rate, for example, by way of a switched filter circuit. The switched filter circuit may include a plurality of low-pass filters that are selected as a function of the data rate. Since the carrier signal is continuously transmitted, a phase reference is available to demodulate all received power and the peak transmitted power is approximately equal to the average transmitted power even at data rates corresponding to bit times that are large compared to the differential time delay of the demodulator.

15 Claims, 6 Drawing Sheets

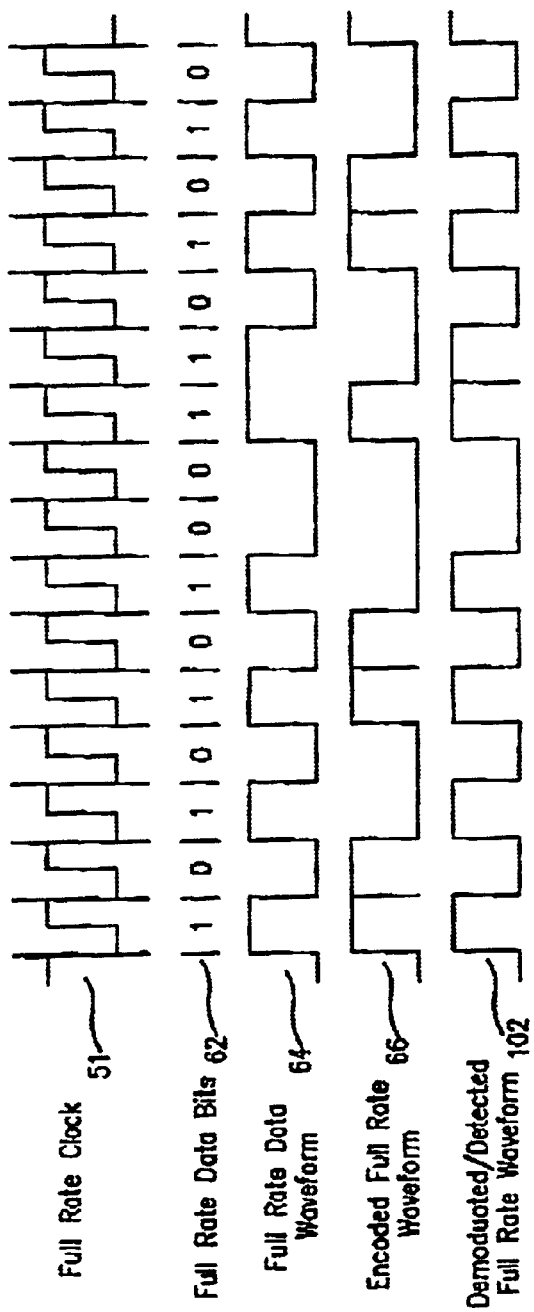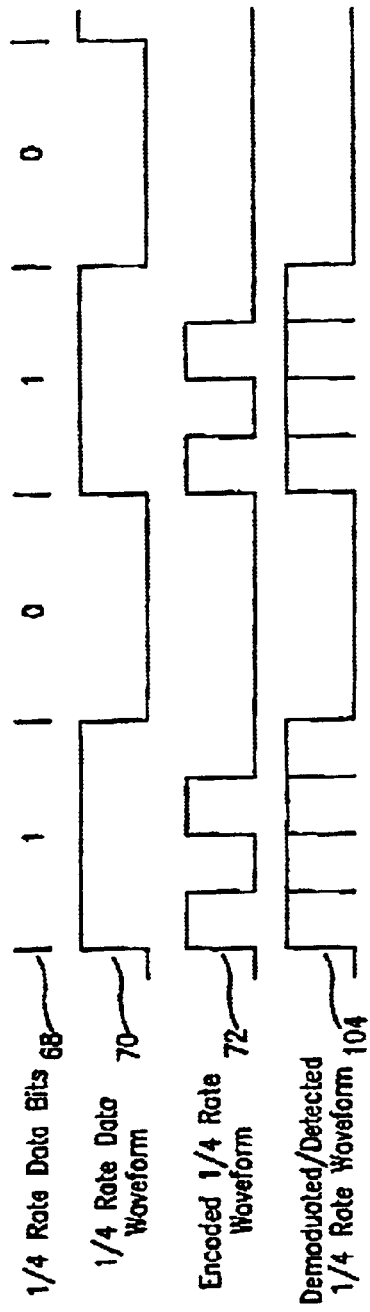

VARIABLE RATE DPSK SYSTEM ARCHITECTURE

CROSS-REFERENCE TO RELATED APPLICATIONS

This application is related to the following commonly-owned application: "A Multi-Rate Variable Duty Cycle Modem for Use in an Optical Communications System", Ser. No. 09/522,802, filed on Mar. 10, 2000.

BACKGROUND OF THE INVENTION

1. Field of the Invention

The present invention relates generally to a communication system and more particularly to a variable rate differential phase shift keying (DPSK) system which includes a continuous transmitter and a multi-rate receiver with a single demodulator.

2. Description of the Prior Art

Fixed rate differential phase shift keying (DPSK) digital communication systems are known to have performance comparable to coherent phase shift keyed systems but without the need for a coherent phase reference in the receiver. In such DPSK digital communication systems, the received signal waveform is demodulated, for example, by splitting the received signal in two parts, adding a time delay to one of the two parts and recombining the two signals. The delayed version of the received signal provides the necessary phase reference. The time delay is typically equal to the period of one data bit. One possible implementation of such a demodulator for optical communications systems employing DPSK signaling is an interferometer, such as a Mach-Zehnder interferometer, with unequal optical paths such that the difference in the optical path delay between the two legs of the interferometer is equal to the time of one bit.

Communication systems using DPSK signaling and capable of operating at multiple data rates are known but are hardware intensive and normally require a separate demodulator for each data rate. Each individual demodulator introduces a differential time delay corresponding to the desired bit time for that data rate. In order to solve this problem, commonly-owned U.S. patent application Ser. No. 09/522,802, filed on Mar. 10, 2000, discloses a variable duty cycle DPSK communication system which operates at multiple data rates. Although the variable duty cycle approach permits the use of a single demodulator, there are other problems with this approach. First, it suffers a power penalty because the received power sent during the first bit time for each block of data can not be demodulated because it lacks a phase reference, thus it is wasted. The wasted power approaches one half of the total transmitted power for data rates with low duty cycles. Also, the increase in the ratio of the peak power to the average transmitted power for such variable duty cycle waveforms increase the dynamic range requirements on many signal path components. Such components must tolerate proportionately higher peak power than would otherwise be required. Thus, there is a need for a DPSK communication system which can operate at multiple data rates which minimizes transmitted power requirements without corresponding performance loss and also minimizes hardware.

SUMMARY OF THE INVENTION

Briefly, the present invention relates to a communication system and more particularly to a variable rate differential phase shift keying (DPSK) communication system with minimal hardware that does not have power or performance penalties associated with known DPSK modulation systems. The DPSK modulation system in accordance with the present invention includes a transmitter which includes a carrier signal source, a phase modulator and a DPSK encoder for modulating a carrier signal. The modulated carrier signals may be amplified, for example, by a rare earth element doped fiber amplifier. The signals are transmitted to a multi-rate receiver through a communication channel, for example, free space. The multi-rate receiver includes a single demodulator, for example, a single optical interferometer, used for multiple integer sub-harmonic data rates, which demodulates the modulated signal. The demodulated signals are detected, for example, by an arrangement of photodiodes, and the detected signals are applied to, for example, a clock and data recovery circuit that is tuned as a function of the data rate, for example, by way of a switched filter circuit. The switched filter circuit includes a plurality of low-pass filters that are selected as a function of the data rate. Since the carrier signal is continuously transmitted, a phase reference is available to demodulate all received power and the peak transmitted power is approximately equal to the average transmitted power even at data rates corresponding to bit times that are large compared to the differential time delay of the demodulator.

DESCRIPTION OF THE DRAWINGS

These and other advantages of the present invention will be readily understood with reference to the following specification and attached drawing wherein:

FIGS. 3A–3I represent exemplary waveforms of the optical communication system illustrated in FIG. 2.

DETAILED DESCRIPTION OF THE INVENTION

Figure 1:
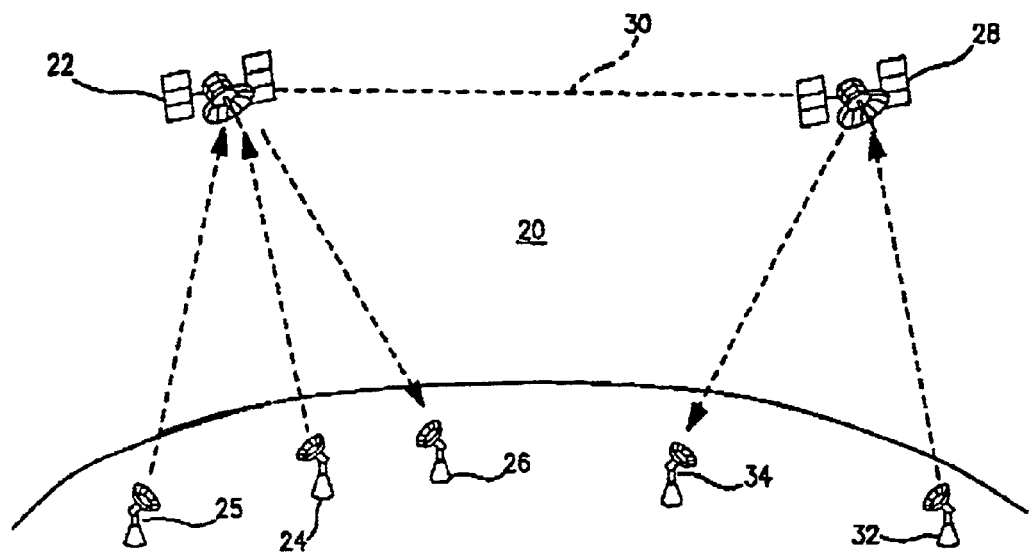
FIG. 1 is a block diagram of a typical satellite data communication system.

The present invention relates to a communication system and in particular to a multi-rate optical DPSK communication system which may be used as part of a satellite communication system, for example, an intersatellite link, as illustrated in FIG. 1. However, the principles of the present invention are applicable to any multi-rate communication system using DPSK signaling to exchange data between two locations via a transmission medium. Examples of such a transmission media include but are not limited to electrical cable, optical fiber or free space.

FIG. 1 represents an exemplary satellite communication system, generally identified with the reference numeral 20. The satellite communication system 20 includes at least one satellite 22 which may be used to complete a virtual connection between ground stations, for example, the ground stations 24, 25 and 26. In particular, the ground stations 24 and 25 are transmitting ground stations while the ground station 26 is a receiving ground station. In general, data is up-linked to the satellite 22 by way of the transmitting ground stations 24 and 25 and down-linked to the receiving ground station 26. The virtual connection may be made between the ground stations 24 and 26 or between the ground stations 25 and 26. In order to extend geographic coverage of the satellite communication system 20, a second satellite 28 may be provided. The second satellite 28 is in communication with the first satellite 22 by way of an intersatellite communication link 30. As shown, the satellite 28 is in direct communication with a transmitting ground station 32 and a receiving ground station 34. By providing the intersatellite link 30, the satellite 28 can communicate with the ground stations 24, 25 and 26 in addition to the ground stations 32 and 34. Similarly, the satellite 22 is able to communicate with the ground stations 32 and 34 in addition to the ground stations 24, 25 and 26.

Figure 2:
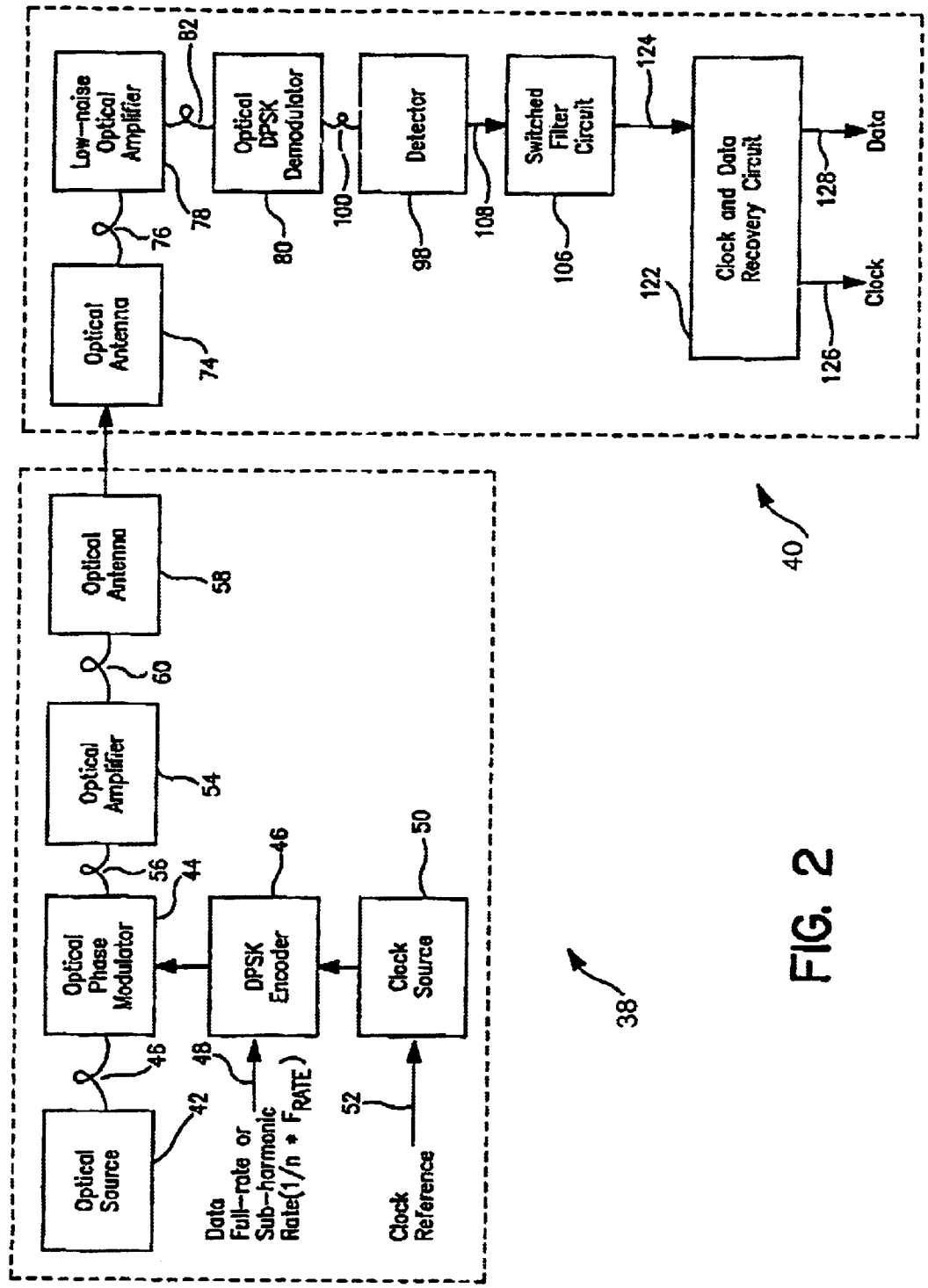
FIG. 2 is a block diagram of the optical communication system in accordance with the present invention.

FIG. 2 illustrates an optical communication system, generally identified with reference numeral 36, in accordance with the present invention. The optical communication system 36 includes a transmitter, shown within the dashed box 38, and a receiver, shown within the dashed box 40. As shown, the transmitter 38 and receiver 40 include optical antennae used when the transmission medium between the transmitter 38 and receiver 40 is free space, for example, in an application of an intersatellite communication link as discussed above. In applications where the transmission medium between the transmitter 38 and receiver 40 is not free space, the transmitter 38 and receiver 40 may be connected together by way of an optical fiber (not shown) which forms the transmission medium. In applications, in which the carrier signal source is not an optical signal source, for example, radio frequency DPSK communications systems, the transmission medium may be free space or a suitable conductor for the radio frequency signals of interest, for example, coaxial cable. All of such embodiments are within the broad scope of the present invention.

Turning back to FIG. 2, the transmitter 38 includes a source of an optical carrier signal. The optical source 42 is a single frequency, narrow line width source, for example, a Northern Telecom, Ltd. Model LC155CD-20 distributed feedback laser. Other single frequency optical sources are also suitable for providing the optical carrier signal.

The optical carrier source 42 is optically coupled to a phase modulator 44 by way of an optical link 46, for example, an optical fiber. The optical phase modulator 44, for example, a Sumitomo Osaka Cement Co. Model T-PM1.5-20 or other such device capable of controlling the optical phase of the carrier signal source, is used to modulate the optical carrier signal from the laser source 42. In particular, the phase modulator 44 modulates the phase of the optical carrier signal by either shifting the carrier phase 180 degrees or not at all depending on the output of differential phase shift key (DPSK) encoder 46. More particularly, the external phase modulator 44 is under control of the DPSK encoder 46. As shown, the DPSK encoder 46 receives the incoming data as indicated by the arrow 48. The system 36 is a multi-rate system and thus is able to receive full rate data or sub-harmonic rate data.

Figure 4:
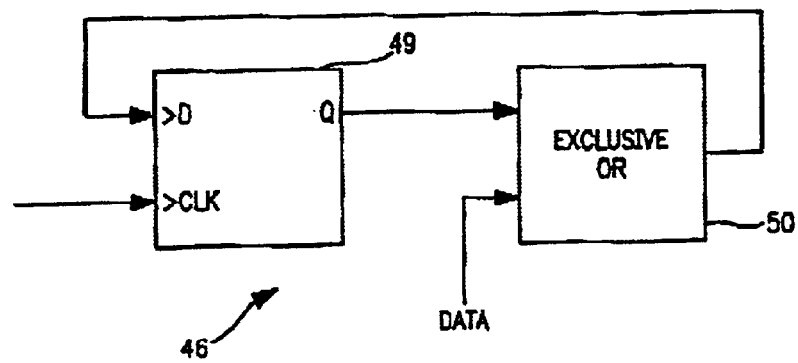
FIG. 4 is a schematic diagram of an exemplary DPSK encoder which forms a part of the present invention.

An exemplary DPSK encoder 46 is illustrated in FIG. 4. The DPSK encoder may include a D type flip-flop 49 and dual input exclusive-OR gate 50. The output of the D flip-flop is applied to one input of the exclusive-OR gate. The data to be modulated is applied to the other input. The output of the exclusive-OR gate 50 is applied to the D input of the D flip-flop 49. Essentially, the DPSK encoder 46 receives the incoming data and performs an exclusive-OR function on the previously encoded data before latching.

A clock source 50 is used to apply a full rate clock signal to the DPSK encoder 46. The clock source 50 may have a waveform 51, for example, as shown in FIG. 3A, which illustrates an exemplary full rate input clock. The clock source 50 is controlled by the clock reference as indicated by the arrow 52. The clock reference 52 is typically provided by the equipment that produces the incoming data 48. If such a clock reference is not available, it may be generated using the techniques employed by the receiver 40 to regenerate a clock signal from the incoming data 48. In the case that the frequency of the clock reference 52 is not equal to the full rate, the clock source 50 may include conventional circuitry by which the clock reference frequency is multiplied up to the full rate frequency, for example, by phase-locked loop frequency synthesis or other such frequency multiplication techniques known to those having ordinary skill in the art, to produce a full rate input clock.

In some applications, the modulated carrier signals from the external phase modulator 44 may be amplified, for example, by a rare earth element doped fiber amplifier, for example, an IPG Laser GmbH Model EAD-1000. The optical phase modulator may be optically coupled to the optical amplifier 54 by way of an optical fiber 56.

The optical amplifier 54 is coupled to an optical antenna 58 by way of an optical fiber 60. The optical antenna 58 converts the phase modulated optical signal from the optical amplifier 54 to a form that may be applied to the transmission medium connecting the transmitter 38 and the receiver 40. In applications where the transmission medium between the transmitter 38 and receiver 40 is free space, an exemplary optical antenna 58 converts the phase modulated optical signal from the optical amplifier 54 to a free space optical beam. In this case, an exemplary optical antenna is a Cassegrain telescope or other similar optical device known to those having ordinary skill in the art. If the transmission medium between the transmitter 38 and receiver 40 is an optical fiber, the optical antenna 58 is not required. In such applications, the optical fiber 60 may be connected directly to the receiver 40.

The optical communication system 36 is adapted to operate at multiple data rates, for example, 1/n times the full data rate for integer values of n. An exemplary full rate binary data sequence 62 is illustrated in FIG. 3B. The full rate data waveform 64 corresponding to the binary data sequence 62 is illustrated in FIG. 3C, where the two levels in the waveform represent either a logical "1" or a logical "0". The encoded full rate waveform 66 illustrated in FIG. 3D represents the result of applying the binary data sequence 62 to the DPSK encoder 46 in FIG. 4 with the DPSK encoder 46 clocked by the full rate clock 51. The encoded full rate waveform 66 also represents the relative phase of the optical carrier at the output of the optical phase modulator 44 in FIG. 4, with a logical "1" corresponding to a phase change of the optical carrier of 180 and a logical "0" corresponding to no phase change.

An exemplary binary data sequence 68 at ¼ of the full data rate is illustrated in FIG. 3F. The ¼ rate data waveform 70 corresponding to the binary data sequence 64 is illustrated in FIG. 3G. As discussed above, the two levels in the ¼ rate data waveform 70 represent either a logical "1" and logical "0". The encoded ¼ rate waveform 72 illustrated in FIG. 3H represents the result of applying the binary data sequence 68 to the DPSK encoder 46 in FIG. 4. As discussed above, the DPSK encoder 46 is clocked by the full rate clock 51 even though the data rate of the binary data sequence 64 is ¼ of the full data rate. The encoded ¼ rate waveform 72 also represents the relative phase of the optical carrier at the output of the optical phase modulator 44 in FIG. 4, with a logical "1" corresponding to a phase change of the optical carrier of 180 and a logical "0" corresponding to no phase change.

The transmitted optical signals from the transmitter 38 are received by the receiver 40. In applications where the transmission medium is free space, the receiver may include an optical antenna 74 which collects the transmitted beam from the transmit optical antenna 58 and couples it into an optical fiber 76. As discussed above, in applications where the optical communication system is used in optical fiber systems where the transmission medium is an optical fiber, the receive optical antenna 74 is eliminated and a single optical fiber may be coupled directly between the optical amplifier 54 and the receiver 40. The waveforms 66 and 72 are illustrative of the full rate and quarter rate modulated signals received by the receive optical antenna 74.

Since there are losses in the optical transmission, the optical fiber 76 may be coupled to a low noise optical amplifier 78, which may also be rare earth element doped fiber amplifier, as discussed above. The output of the low-noise amplifier 78 may be coupled to an optical DPSK demodulator 80 by means of an optical fiber 82. In some applications, as in the case that the losses of the transmission medium between the transmitter 38 and the receiver 40 of the optical communication system are sufficiently low, the optical fiber 56, which connects the optical phase modulator 44 to the optical amplifier 54, may be connected directly to the optical DPSK demodulator 80.

Figure 5:
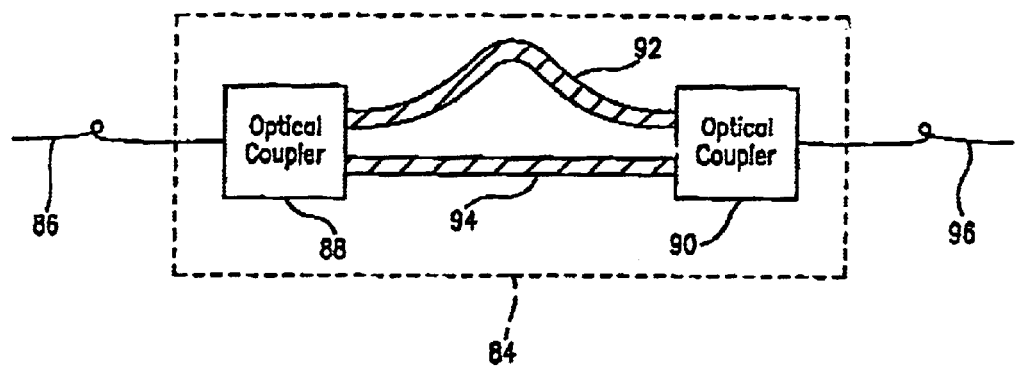
FIG. 5 is an exemplary optical DPSK demodulator for use with the present invention.

An exemplary optical DPSK demodulator is an unbalanced Mach-Zehnder interferometer 84, shown on FIG. 5, similar in function to a device supplied by Photon Integration Research, Inc., under Model FDM-3G-1.5-M. Incoming light from an optical fiber 86 is divided into two signals by an optical coupler 88 and recombined by another optical coupler 90 after the two signals have propagated down a pair of optical paths 92 and 94. The optical paths 92 and 94 may be constructed such that the difference in the optical path delay between them is equal to the period of one bit. The unbalanced Mach-Zehnder interferometer 84 will thus have an output 96 that is proportional to the coherent sum of the optical signal at the input and a time-delayed version of the input signal. If the two versions of the input signal are in phase, they will constructively interfere and produce a high intensity output signal. If the two versions of the input signal are out of phase, they will destructively interfere and produce a low intensity output signal. The unbalanced Mach-Zehnder interferometer 84 therefore converts the differential phase of the input optical signal into an intensity, thereby performing the DPSK demodulation function for a data rate whose bit period corresponds to the difference in optical path delay between optical paths 92 and 94. Commonly-owned U.S. patent application Ser. No. 09/236,981, "Apparatus and Method for Tuning an Optical Interferometer", filed on Jan. 26, 1999 describes a method for precisely controlling the optical path difference of such an interferometer. Other interferometer implementations may also be used to demodulate optical DPSK signals, including other Mach-Zehnder interferometer configurations.

The optical output from the DPSK demodulator 80 may be coupled to a detector 98 by way of an optical fiber 100. The detector 98 converts the demodulated optical DPSK signal into an electrical signal representative of the differential phase of the optical signal received by the receiver 40. An exemplary detector is described in U.S. Pat. No. 6,064,507, "High Speed Differential Optoelectronic Receiver". Other detector implementations may also be used.

FIG. 3E illustrates the demodulated and detected waveform 102 produced by the detector 98 when the exemplary full rate binary data sequence 62 is applied to the transmitter 38 and received by the receiver 40, which includes an optical DPSK demodulator 80 configured to introduce a differential time delay corresponding to one bit period at the full data rate of the communication system 36. The two levels in the demodulated and detected waveform 102 correspond to, for example, either constructive interference or destructive interference between the optical signals in the two optical paths 92 and 94 of the unbalanced Mach-Zehnder interferometer 84, as described above. The associated "high" and "low" optical signal levels are converted by the detector 98 to equivalent electrical signals levels representing either a logical "1" or a logical "0".

FIG. 3I illustrates the demodulated and detected waveform 104 produced by the detector 98 when the exemplary quarter rate binary data sequence 68 is applied to the transmitter 38 and received by the receiver 40, which, as in the full data rate example above, includes an optical DPSK demodulator 80 configured to introduce a differential time delay corresponding to one bit period at the full data rate of the communication system 36. The two levels of the demodulated and detected waveform 104 represent either a logical "1" or logical "0" as described above.

The ability of the optical communication system 36 to communicate using DPSK signaling at variable sub-harmonic rates using a single demodulator 80 is apparent upon noting that: 1) the exemplary full rate demodulated and detected waveform 102 produced internal to the receiver 40 is a replication of the associated full rate data waveform 62 input to the transmitter 38; 2) the exemplary quarter rate demodulated and detected waveform 104 produced internal to the receiver 40 is a replication of the associated full rate data waveform 68 input to the transmitter 38; and 3) both the exemplary detected and demodulated waveforms are produced by a single optical DPSK demodulator 80 configured to introduce a differential time delay corresponding to one bit period at the full data rate of the communication system 36.

Figure 6:
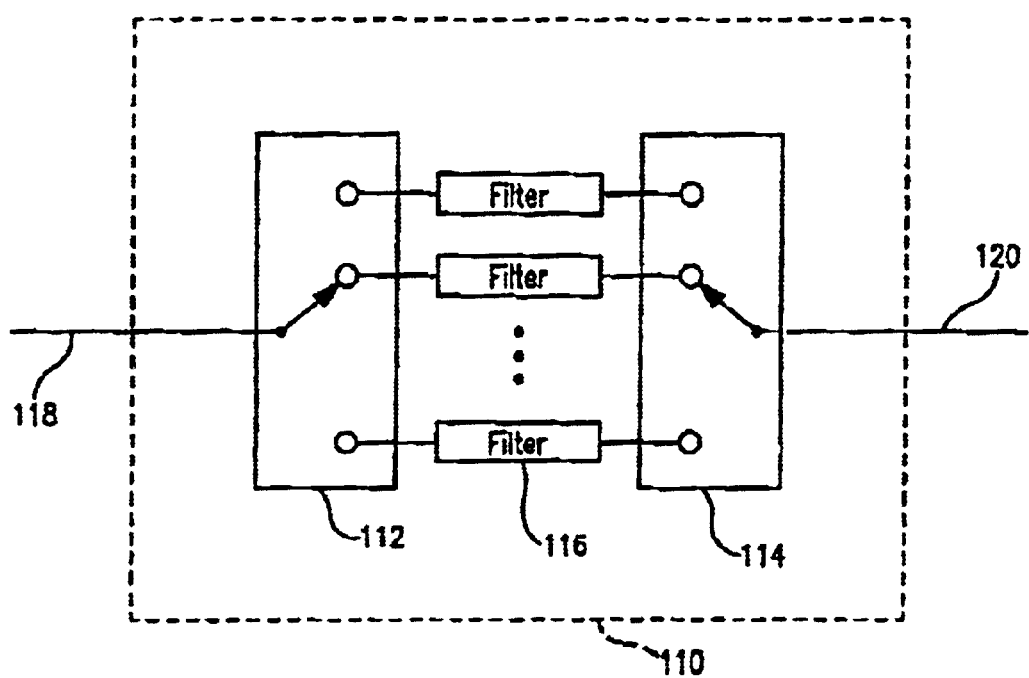
FIG. 6 is an exemplary switched filter circuit for use with the present invention.

Since the components in the transmitter 38 and receiver 40 introduce noise and produce other imperfections, for example, due to band limiting of the electrical circuits, the performance of the communication system 36 may be enhanced by coupling the detector 98 to a switched filter circuit 106, which includes a plurality of selectable filters, by way of an electrical conductor 108. An exemplary switched filter circuit 106 is shown in FIG. 6 and includes an input switch 112, an output switch 114 and a plurality of filters 116. The plurality of filters 116 may consist of as many as one filter for each data rate. A signal applied to the switched filter circuit 106 by way of an electrical conductor 118 is directed by the input switch 112 to the output switch 114 through one filter out of the plurality of filters 116. The output switch 114 directs the filtered signal to the output of the switched filter circuit 110 as indicated by the arrow 120. Such switched filter circuits are known by those with ordinary skill in the art. The characteristics of any individual filter among the plurality of filters 116 may be designed to match or approximate the filter characteristics that optimize the performance of the receiver 40 at specific data rates.

Figure 7:
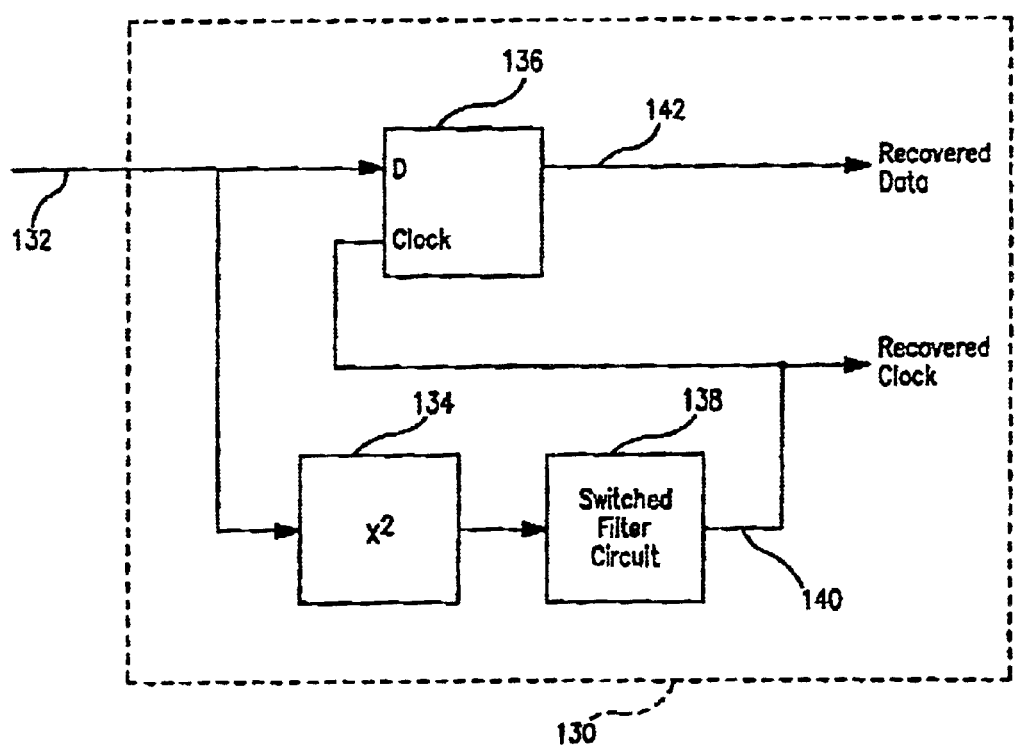
FIG. 7 is an exemplary clock and data recovery circuit for use with the present invention.

The output of the switched filter circuit 106 is coupled to the clock and data recovery circuit 122, by way of an electrical conductor 124. The data recovery circuit 122 regenerates the clock, as indicated by arrow 126, and the detected data, as indicated by arrow 128. An exemplary clock and data recovery circuit 130 is illustrated in FIG. 7.

The input to the clock and data recovery circuit 130, indicated by the arrow 132, is applied to a squaring circuit 134, for example, a step recovery diode, and to a D type flip-flop 136. The output of the squaring circuit is coupled to switched filter circuit 138. The switched filter circuit 138 may include a plurality of bandpass filters, with one bandpass filter, tuned to the clock frequency, for each desired data rate. The output of the switched filter circuit is the recovered clock signal, as indicated by the arrow 136, which is applied to the D type flip-flop 136. The output of the D type flip-flop 136 is the recovered data, as indicated by arrow 142. Clock and recovery circuits are known to those with ordinary skill in the art. Other clock and data recovery circuits, including those that recover the clock directly from the output of the detector 98, are possible.

Obviously, many modifications and variations of the present invention are possible in light of the above teachings. Thus, it is to be understood that, within the scope of the appended claims, the invention may be practiced otherwise than as specifically described above.

What is desired to be secured by a Letters Patent is as follows.

We claim:

1. A communication system for transmitting multi-rate data signals between a transmitter and a receiver, the communication system comprising:

a transmitter including a modulator for modulating data signals having different data rates defining modulated data signals and continuously transmitting said modulated signals over a predetermined medium, said transmitter configured to modulate said data signals by differential phase shift keying (DPSK); and a receiver for receiving said modulated signals, said receiver including a single demodulator for demodulating said modulated signals; said demodulator including a single optical DPSK demodulator which includes a first coupler for dividing the incoming optical modulated data signals into two unequal light paths such that the optical path delay between said paths is one data bit period; a second coupler for recombining the optical signals from the unequal light paths; a switched filter circuit optically coupled to said demodulator and said switched filter circuit including a plurality of filters, each filter being tuned to a different data rate; and a clock and recovery circuit for recovering the data and clock signals.

2. The communication system as recited in claim 1, wherein said transmitter includes a phase modulator and differential phase shift keying (DPSK) encoder.

3. The communication system as recited in claim 2, wherein said transmitter includes a clock source in optical communication with said DPSK encoder.

4. The communication system as recited in claim 1, wherein said predetermined medium is free space.

5. The communication system as recited in claim 4, wherein said transmitter includes an optical carrier source and an optical antenna.

6. The communication system as recited in claim 5, wherein said receiver includes an optical antenna.

7. The communication system as recited in claim 6, wherein said transmitter includes an optical amplifier.

8. The communication system as recited in claim 7, wherein said receiver includes an optical amplifier.

9. The communication system as recited in claim 1, wherein said medium is an optical fiber.

10. The communication system as recited in claim 1, wherein said demodulator is configured with a predetermined time delay and said receiver is adapted to provide data rates with bit periods that are an integer multiple of said time delay.

11. The communication system as recited in claim 2, wherein said DPSK encoder includes an exclusive OR gate.

12. The communication system as recited in claim 2, wherein said modulation signals are generated as an exclusive OR function of said data signals.

13. The communication system as recited in claim 2, wherein said transmitter includes an optical amplifier in optical communication with said optical phase modulator.

14. A receiver for receiving and demodulating optical data signals having different data rates, the receiver comprising:

a single optical DPSK demodulator which includes a first coupler for dividing the incoming optical modulated data signals into two unequal light paths such that the optical path delay between said paths is one data bit period;

a second coupler for recombining the optical signals from the unequal light paths;

a switched filter circuit optically coupled to said demodulator and said switched filter circuit including a plurality of filters, each filter being tuned to a different data rate; and a clock and recovery circuit for recovering the data and clock signals.

15. The receiver as recited in claim 14, wherein said DPSK demodulator is a Mach Zehnder interferometer.

* * * * *